United States Patent [19]

Guerlet et al.

[11] Patent Number: 5,699,680
[45] Date of Patent: Dec. 23, 1997

[54] WIRES INCORPORATING A HELICAL COMPONENT, ASSEMBLIES THEREOF, AND USE OF SAID ASSEMBLIES AS CATALYZER AND/OR TO RECOVER PRECIOUS METALS

[75] Inventors: Jean-Paul Guerlet, Paris; Claude Lambert, Saint-Witz, both of France

[73] Assignee: Engelhard-Clal SAS, Paris, France

[21] Appl. No.: 379,478

[22] PCT Filed: Jul. 22, 1993

[86] PCT No.: PCT/FR93/00752

§ 371 Date: Jan. 31, 1995

§ 102(e) Date: Jan. 31, 1995

[87] PCT Pub. No.: WO94/03665

PCT Pub. Date: Feb. 17, 1994

[30] Foreign Application Priority Data

Jul. 31, 1992 [FR] France ................... 92 09578

[51] Int. Cl.⁶ .................. D04B 21/12; D03D 15/02; B01J 23/40

[52] U.S. Cl. .................. 66/202; 66/170; 139/420 R; 502/439; 502/527; 57/216; 57/212; 442/6; 442/308; 442/229

[58] Field of Search ............... 57/210, 216, 220, 57/212; 66/202, 170; 139/383 R, 420 R, 425 R; 502/527, 439; 442/4, 6, 7, 31, 308, 316, 189, 228, 229

[56] References Cited

U.S. PATENT DOCUMENTS

| | | | |
|---|---|---|---|
| 3,660,024 | 5/1972 | Gillespie | 252/477 |
| 4,313,998 | 2/1982 | Pivot et al. | 57/210 |
| 4,375,426 | 3/1983 | Knapton et al. | 252/472 |
| 4,435,373 | 3/1984 | Knapton et al. | 423/403 |
| 4,926,910 | 5/1990 | Wade | 57/210 |
| 5,188,813 | 2/1993 | Fairey et al. | 66/202 |

Primary Examiner—C. D. Crowder
Assistant Examiner—Larry D. Worrell, Jr.
Attorney, Agent, or Firm—Larson & Taylor

[57] ABSTRACT

A wire comprising at least one helically wound wire element is disclosed. The helical winding consists of a platinoid or platinoid alloy wire (20). Also disclosed are assemblies of these wires (20) such as knitted materials, fabrics and felts, and the use of said assemblies as catalysers in the reaction for preparing nitric or cyanhydric acid, and to recover precious metals from these catalysers.

57 Claims, 7 Drawing Sheets

WIRES INCORPORATING A HELICAL COMPONENT, ASSEMBLIES THEREOF, AND USE OF SAID ASSEMBLIES AS CATALYZER AND/OR TO RECOVER PRECIOUS METALS

FIELD OF THE INVENTION

The present invention relates to novel threads containing at least one element in the form of a helical winding, to their assemblings, particularly in the form of woven fabrics, knits or felts, and to the use of these assemblies as catalyst and/or for recovering the precious metals.

BACKGROUND OF THE INVENTION

The industrial process for preparing nitric acid includes as essential step the oxidation of ammmonia into nitric oxide. This reaction is conducted industrially by passing a mixture of air and ammonia over a metal catalyst generally constituted by platinum or a platinum alloy. The precise conditions of reaction vary little from one installation to the other; the mixture of 10% ammonia and 90% air by volume is preheated to a temperature of 180°–250° C. before passage through the catalyst. The principal reaction:

is effected during the time of contact with the catalyst, with a yield which may attain 96%. This exothermic reaction raises the temperature of the gases and maintains the catalyst at 850°–900° C. The composition of the gases is such that there remains an excess of oxygen after reaction; in the range of temperatures attained, this oxygen forms with the platinum a volatile oxide, which produces a loss of matter from the catalytic cloths. These platinum losses vary, depending on the operating conditions of the installations and are of the order of 50 to 400 mg of platinum per ton of nitric acid produced.

The metallic catalyst is generally in the form of cloths obtained by weaving linear threads. Numerous industrial installations, or burners, thus use platinum and rhodium alloys drawn into threads of 60 or 76 μm diameter, then woven at a rate of 32 threads/cm warpwise and weftwise, to obtain a fabric comprising 1024 stitches/cm$^2$. A catalytic bed is constituted by 3 to 40 superposed layers or cloths, this number essentially depending on the operational pressure and the mass flowrate of the gases reduced to the surface unit of the catalytic bed. The diameter of the catalytic cloths attains 5 m in certain burners.

The volatilized platinum may be partially picked up by means of palladium alloy cloths placed immediately beneath the layers of platinum cloths. These palladium alloy cloths are woven products, produced in the same way as the catalytic cloths.

The same catalytic cloths are also employed by the synthesis of hydrocyanic acid by the Andrussow process. The overall reaction is the following:

This exothermic reaction raises the temperature of the gases to 1100° C. The operational conditions are such that there is no excess oxygen and that platinum oxide cannot be formed; the level of the platinum losses is, in this case, very low.

The form of embodiment of the platinum alloy catalysts has remained to this day virtually identical to that developed at the beginning of the 20th century. Certain improvements in the structure of the catalysts have been proposed, but they have not led to a long-lasting industrial exploitation.

French Patent 2 074 921 describes the replacement of about ⅓ to ⅔ of the precious metal cloths by a foraminous structure of non-precious metal, corrosion-resistant and such that the pressure drop is unchanged. This foraminous structure may be made in the form of a metal pad constituted by wires oriented at random.

European Patent 0 275 681 describes a catalyst pack comprising a foraminous layer of fibers of a metal of the platinum group or an alloy containing same and at least one layer of foraminous ceramic material having a coating of at least one of the metals of the platinum group.

French Patent 2 467 629 describes a catalytic bed which comprises an assembly or an agglomeration of fibers of a metal or an alloy of the platinum group.

It should be noted that the examples described in these Patents present the common point of requiring the permanent use of one or more platinum cloths of the prior art to which novel structures are added; the novel structures which are described in these Patents do not present a cohesion and sufficient mechanical properties to be self-supporting. The processes described make it possible to reduce the number of cloths of the prior art used, without being able to replace them entirely.

European Patent 0 364 153 describes the use of a knit obtained by a particular process where the metal wire is associated with a yarn of textile origin, the latter principally contributing an effect of lubrication; the latter is rendered necessary by the intense frictions exerted on the yarn by the knitting machine hooks. The preparation of knits by this process presents economical advantages, but also difficulties in obtaining knits which are sufficiently dense and whose stitches are as small as those of the cloths of the prior art. The maximum width of the webs obtained is only 457 mm, which requires the welding of numerous parallel webs to obtain pieces going up to a diameter of 5 m. Despite these drawbacks, knits are manufactured in accordance with this process, industrially.

The conventional processes of manufacturing metallic cloths, woven fabrics or knits use simple or linear threads. These processes present technological limitations, encountered for example due to the insufficient mechanical properties of certain metals whose threads break too often during manufacture. They also present limitations of principle, such as for example the impossibility of choosing the mass per surface unit, the diameter of the threads and the number of stitches per surface unit, independently.

SUMMARY OF THE INVENTION

The present invention makes it possible to overcome these drawbacks by replacing the linear metal threads conventionally used by threads previously prepared in the form of helical elements.

The use of the threads according to the invention presents an essential advantage which is that of offering a considerable flexibility in the creation of the finished products and of making available new constructional parameters which were not accessible in the prior art. In the products containing the novel threads of the invention, it becomes possible to predetermine the mean mass per m$^2$ and the thickness of the fabric, independently, without alteration of the pressure drop presented to the flow of the reagent gases.

The present invention makes it possible to produce novel structures of catalyst beds, by using the threads of novel structure hereinabove in replacement of the simple or linear threads which constitute the fabrics of the prior art. Contrary to the majority of the products of the prior art, the products obtained by means of the novel threads according to the invention present the advantage of necessitating no addition of cloths of the prior art in order to be used in the industrial installations for manufacturing nitric acid.

The threads according to the invention are intended for manufacturing products such as metallic cloths, woven fabrics or knits, these products, when they are principally constituted by precious metals, being usable as catalysts for manufacturing nitric acid, hydrocyanic acid, or as device for collecting the precious metals volatilized in the course of the reaction of manufacture of nitric acid.

Threads containing a helical winding of metal are already known. For example, French Patent 2 438 114 describes complex filiform textile elements intended to serve as substrate for a catalytic matter. These elements are constituted by a core of textile fiber of refractory material and of metallic enveloping outer structure.

The helical windings described in French Patent 2 438 114 constitute a means for improving the mechanical properties of certain fabrics of refractory fibers, of the type which are impregnated with catalytic substances to serve as catalyst in heating apparatus. The process described consists in enveloping the fragile fibers by means of a metal thread which constitutes an outer armature. In this process, the quantity of metal thread, inert from the standpoint of catalysis, is selected to cover the surface of the fibers to be reinforced as little as possible: the metallic reinforcement typically covers less than 10% of the surface of the fibers. The articles made according to this process contain a small proportion of metal matter, which is contrary to the purpose aimed at in the manufacture of catalysts for oxidation of ammonia and that the threads according to the invention make it possible to attain.

Thus, according to a first aspect, the invention concerns a novel thread structure containing at least one helical winding of at least one thread constituted by a metal of the platinoid group or an alloy of such a metal.

It will be recalled that the group of platinoids, also called platinum mine metals, is constituted by the following six metals: platinum, ruthenium, rhodium, palladium, osmium and iridium.

More precisely, according to one of its essential characteristics, the invention concerns a thread comprising at least one helically wound filiform element characterized in that it is constituted by a core formed by at least one filiform element around which is helically wound at least one filiform element constituted by a metal of the platinoid group or an alloy of one of these metals.

Thus, the thread according to the invention is constituted by at least one filiform element of which at least one is constituted by metal of the platinoid group or an alloy of one of these metals and is wound helically.

However, insofar as this is not detrimental to the clarity of the description, each filiform element which itself constitutes a thread will be designated hereinafter likewise by the word thread. It is only when there is risk of confusion that the expression "filiform element" will be used.

According to another aspect of the invention, it relates to assemblings of the above threads, in particular cloths, woven fabrics, knits, felts obtained by different techniques such as weaving, knitting, sewing, embroidery.

According to a third aspect, the invention relates to the use of the assemblings of threads according to the invention as catalysts or as devices for recovering the precious metals, in particular in chemical processes employing said precious metals as catalysts.

DESCRIPTION OF THE DRAWINGS

The different aspects of the invention are illustrated in the following description, given with reference to the different figures.

DETAILED DESCRIPTION OF THE PREFERRED EMBODIMENT

On a core or central thread, constituted by one or more threads of different nature or not, there is wound, with turns which are contiguous or not, at least one metal thread of the alloy or metal of which it is desired to obtain the finished product.

Figure 1:
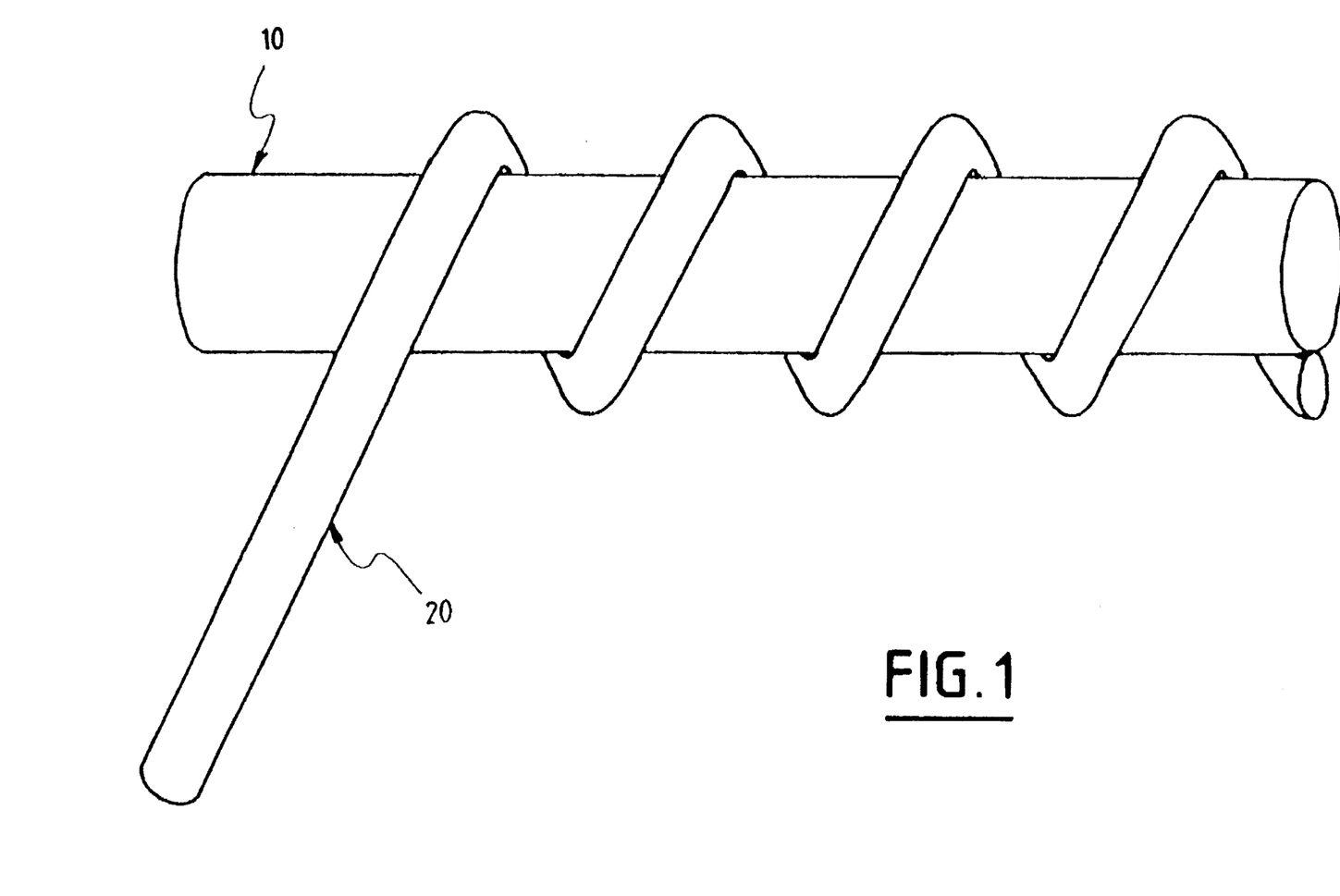
FIG. 1 shows the most simple structure of a thread according to the invention comprising a core around which a thread is helically wound.

FIG. 1 describes the most simple structure of a thread according to the invention in which a thread 20 is helically wound around a thread 10 constituting the core.

The thread 20 is constituted by the active matter necessary for the final use of the product, i.e. for example a platinum alloy in the case of the final use being that of a catalyst, or a palladium alloy if the final use is the collection of the platinum volatilized in a catalytic process employing platinum or one of these alloys as catalyst.

Thread 10 may be:
- either a thread of organic, natural or synthetic nature constituted by a matter adapted to be eliminated by dissolution, fusion or combustion, such as for example, cotton, linen, rayon, Nylon, polyester, fibers of alginates,
- a thread of an eliminatable matter of inorganic nature such as a metal easily soluble in an acid, such as copper, silver, a metal soluble in a base, such as aluminium, or a meltable metal such as tin and lead alloys,
- a thread of an inert, permanent matter in the final use, such as a steel or a refractory stainless alloy,
- or a thread of active matter similar to that of thread 20.

Active matter similar to that of thread 20 is understood to mean a metal of the platinoid group or an alloy of one of these metals known for the same catalytic activity in the reaction of manufacture of nitric acid or hydrocyanic acid or for making devices for recovering platinum during the manufacture of nitric acid. It may therefore be question of a platinoid or an alloy of platinoid identical to or different from the one constituting thread 20.

The threads used for making the helical windings 20 of the threads according to the invention are most often, at the start, in the form of a linear thread, of circular section, with a diameter included between 20 and 400 µm. The use of threads whose section is of different shape, such as circular threads rolled or crushed prior to use according to the invention, also forms part of the invention. It is well known to the man skilled in the art that threads thus deformed present an increased specific surface, which favourably affects the catalytic activity.

When manufacturing the catalytic cloths of the prior art, the platinum alloy threads used have a diameter of between 50 and 90 µm, the most wide-spread alloy compositions being the following: platinum alloyed with 5% rhodium, platinum alloyed with 8% rhodium, platinum alloyed with 10% rhodium, platinum alloyed with 5% rhodium and 5% palladium. These same threads are the threads preferred for manufacturing the novel products for use as catalysts according to the invention, the turns of the novel threads having an outer diameter $D_e$ included between 110 and 1500 µm, obtained by effecting a winding on a core of diameter included between 10 and 1400 µm. The threads preferred for the construction of the catalytic products according to the invention have an outer diameter $D_e$ included between 110 and 500 µm, obtained by effecting a winding on a core of diameter included between 10 and 400 µm.

When manufacturing cloths of the prior art for recovering the volatilized platinum, the threads of palladium alloys used have a diameter of between 50 and 180 µm, the most wide-spread compositions of alloys being the following: palladium alloyed with 5% copper, palladium alloyed with 5% nickel, palladium alloyed with 5 to 20% gold. These same threads are the preferred threads for manufacturing the novel products according to the invention, for the use of recovery of the volatilized platinum, the turns of the novel threads having an outer diameter $D_e$ included between included between 110 and 1500 µm, obtained by effecting a winding on a core of diameter included between 10 and 1400 µm. The threads preferred for the construction of the products according to the invention intended for the recovery of the volatilized platinum have an outer diameter $D_e$ included between 110 and 750 µm, obtained by effecting a winding on a core whose diameter is included between 10 and 650 µm.

In condensed manner, the threads according to the invention may also be characterized in synthetic manner by the value of their mass per unit of length, this value resulting from the choice of the preceding geometrical parameters. Thus, the preferred threads according to the invention are those whose mass per unit of length is included between 1.5 and 5 times the mass of the linear thread employed in their construction and which are obtained for example with a number of turns such that these turns cover 10% at minimum and 100% at maximum of the surface of the threads of the core. The threads preferred for the construction of the catalytic products and the products intended for recovering the volatilized platinum according to the invention have a mass included between 1.8 and 3 times the mass of the linear thread coming within their construction. The preferred threads according to the invention are also such that the turns cover from 20 to 80% of the surface of the threads of the core, which is also expressed by a distance between the turns included between 0.25 times and 4 times the diameter of the thread which constitutes the winding.

The thread 20, which constitutes the turns of a helix, is generally a single one, but it may itself be composite, or the winding may be constituted by a plurality of threads in parallel, possibly of different natures, which forms part of the invention. Moreover, thread 20, as well as the other threads coming within the construction of a thread according to the invention, does not necessarily have a circular section. It may be useful previously to draw a round thread to transform it into a tape which is used for thread 20; in that case, the thread made according to the invention with such a tape presents a flattened outer surface, which facilitates slide of this thread, such a property being useful if the thread is used in a knitting machine.

Figure 2:
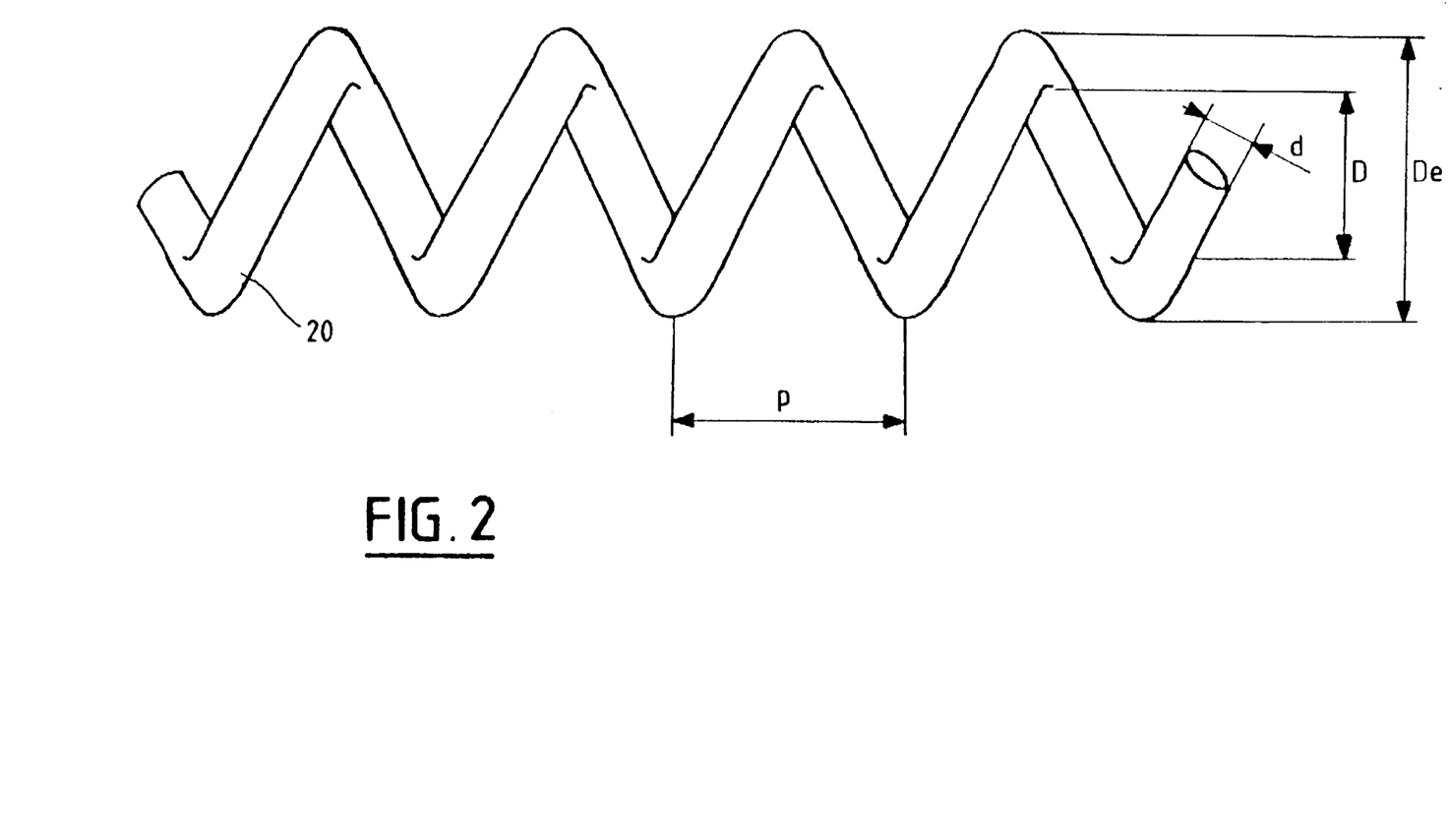
FIG. 2 shows a helical winding according to the invention after the core has been eliminated.

FIG. 2 shows the appearance of a thread according to the invention, after elimination of the central thread by any process, leaving only the helically wound thread of active matter. Such a thread is characterized by its outer diameter "$D_e$", by the diameter "d" of the initial thread, by the inner diameter "D" of the turns and by the pitch "p" of the winding which is the distance between the axes of two adjacent turns. Each of these parameters may be chosen freely, except for the outer diameter $D_e$ which is worth D+2d; this freedom constitutes a characteristic and an essential advantage of the invention, procuring a wide latitude for the choice of the mass and the microgeometry of the threads obtained according to the invention and the finished products that these threads produce.

Another advantage of the threads according to the invention is that they present novel properties facilitating use in the operations of manufacturing fabrics by weaving or by knitting; thus, the central thread serving as support is the one which procures the characteristics of tensile strength of the thread of the invention. The central thread may, according to the invention, thus be chosen from the textile fibers having a high elongation at rupture, much higher than that of simple metal threads. The thread according to the invention will thus present the same characteristics of elongation as the textile thread, whilst incorporating in its structure the metal element which will give the finished product the chemical properties sought as catalyst.

The thread prepared according to the invention allows manufacture of cloths, woven fabrics, knits, by all techniques such as in particular weaving, knitting, sewing, embroidery, without having the fragility of a massive metal thread.

It may be chosen to eliminate the central thread before use of the finished product, for example by decomposition, dissolution, fusion, oxidation, or to conserve it up to the instant of final use, which renders the cloths and knits according to the invention easy to manipulate. Depending on the nature of the central thread and the conditions of final use, the central thread may be eliminated rapidly or slowly, and partially or totally.

If it is chosen to eliminate the central thread, the fabric obtained, constituted solely by helical threads, is exaggeratedly elastic and deformable, the turns being able to be drawn easily. Such a fabric lacks rigidity to such a point that it becomes difficult to manipulate without undergoing deformations. To overcome this drawback, one arrangement of the invention consists in introducing an additional thread in the central core, jointly with the thread of eliminatable matter.

Figure 3:
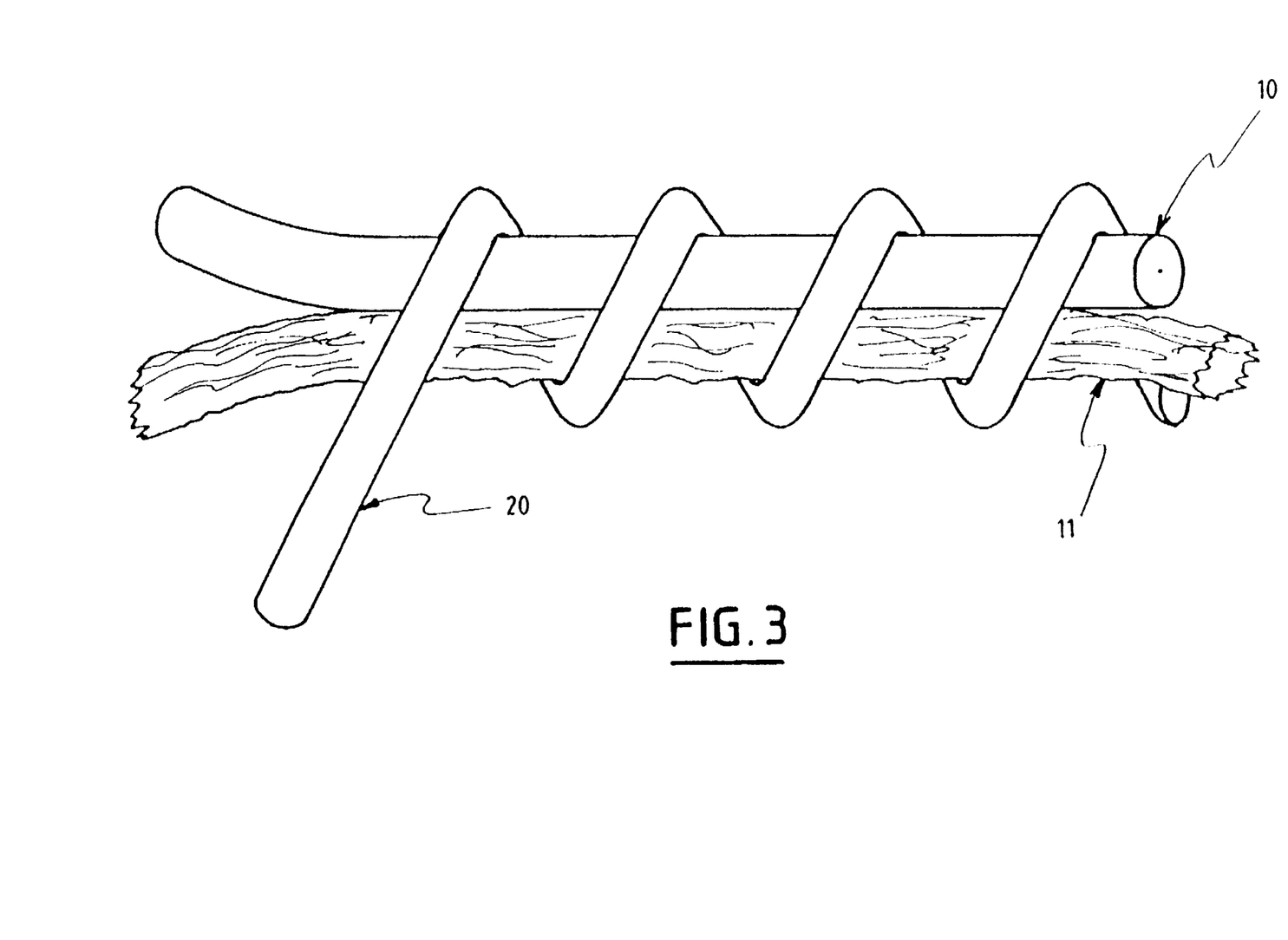
FIG. 3 shows an embodiment of the thread according to the invention where the core is constituted by several threads.

This arrangement, which forms part of the invention, is illustrated in FIG. 3 where the core is constituted by threads 10 and 11, on which is wound thread 20, each of threads 10 and 11 being able to be:

either a thread of an eliminatable matter of organic, soluble, meltable or combustible nature, such as a textile fiber, a thread of an eliminatable matter of inorganic nature, such as a metal which is easily soluble, meltable or oxidizable, a thread of a matter which is inert and permanent in the final use, such as steel or a refractory stainless alloy, or a thread of active matter similar to that of thread 20, thread 20 being constituted by the active matter necessary for the final use of the product, i.e. for example a platinum alloy in the case of the final use being that of a catalyst, or a palladium alloy if the final use is the collection of the platinum volatilized in the course of a catalytic process employing platinum or a platinum alloy as catalyst.

We have observed that a thread according to the invention prepared in accordance with the above arrangement, conserves the novel mechanical properties contributed by the invention, namely the characteristic of tensile strength remain those of the most resistant thread introduced in the core of the thread.

Figure 4:
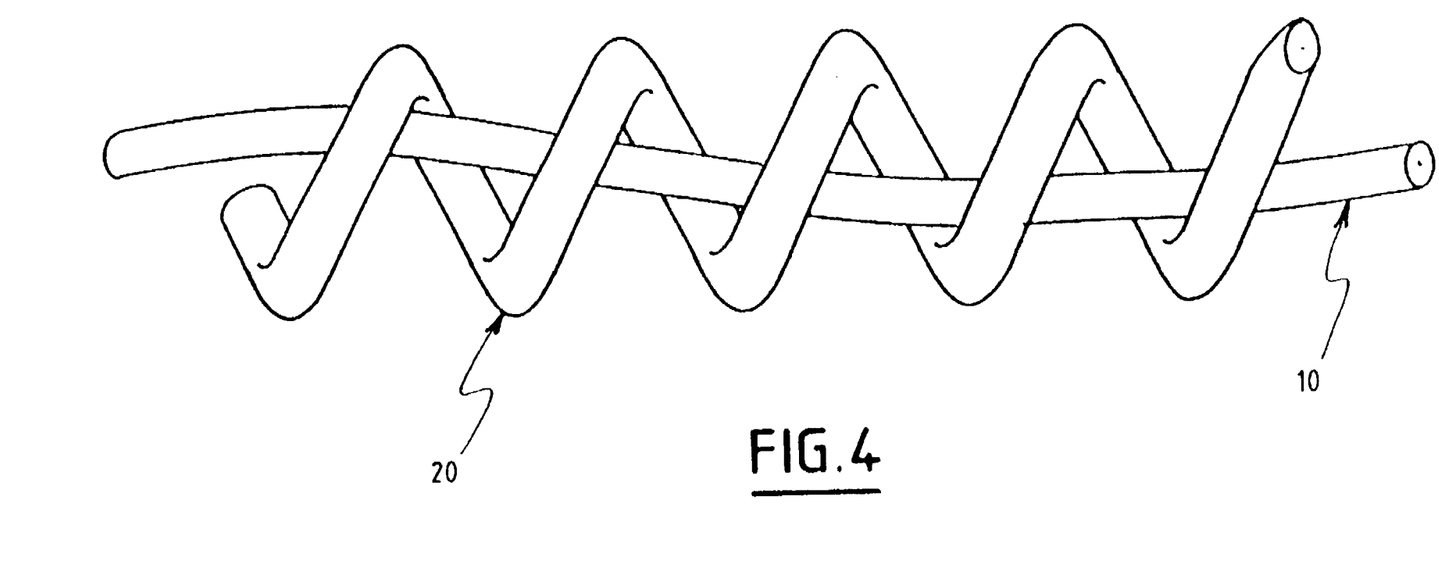
FIG. 4 shows another embodiment of the thread according to the invention where one of the threads constituting the core has been eliminated.

FIG. 4 illustrates the case of the thread 11 having been chosen from the eliminatable matters and where it has been eliminated by an appropriate process. The product obtained, which forms part of the invention, is now constituted only by the thread 20 in helical form including in its inner space the thread 10. In this state, the thread 20, free of any constraints, may be freely positioned in the whole available space released by the elimination of thread 11.

It also results from the invention, whereby a thread is prepared, comprising a helical element in the inner space of which a linear thread may be located, that the products, fabrics or knits, prepared with such a thread, present an exceptional behaviour with respect to deformations. In fact, in the case of an effort of traction exerted on a fabric causing rupture of the threads, a fabric of the prior art presents a tear which is an opening through which the reagent gases may pass without contact with the catalytic matter; this is translated by a loss of reaction yield which may lead to stoppage of the exploitation. A fabric prepared with a thread of the invention does not present this drawback; in the case of excessive effort exerted on the fabric, there is firstly produced rupture of the linear threads, if they are present; but the helical threads are only drawn. According to the manufacturing characteristics, such as diameter of the core and pitch of the turns, the helical threads may thus be drawn by several times their length without breaking. The consequence of this is that a fabric prepared with a thread of the invention and subjected to excessive efforts of traction is locally drawn without creating an opening allowing passage of the reaction gases without contact with the active or catalytic matter.

In the case of manufacture in the form of a knit, the preceding thread may be used, comprising a reinforcing thread in the central core. It is also possible to use a helical thread with eliminatable core according to the invention and simultaneously to supply the knitting machine with this thread and a linear reinforcing thread which may be metallic. In that case, in the finished product, the reinforcing thread will at all points be parallel to the axis of the helical thread according to the invention, but outside the helix.

In the two examples above, the linear thread makes it possible to reinforce the knit produced.

According to another embodiment of knits according to the invention, a knit may be produced by means of a linear thread, and a helical thread according to the invention inserted between the stitches of this knit. Such a composite knit presents the advantage of being able to be produced in one sole operation by using, for example, a circular knitting machine provided with two thread supply devices.

In such composite knits, the linear thread used may either be a thread of platinoid or platinoid alloy of nature identical to that used for the helical winding, or a thread of refractory material inert at the temperature of use of the catalyst.

In the case of weaving, it suffices to introduce a proportion of linear threads among the threads according to the invention, this proportion being able to be different in the warp and in the weft.

These linear threads are constituted either by threads of platinoid or platinoid alloy of the same type as those used for effecting the helical winding, or by threads constituted by a refractory alloy.

The use of a helical thread whose core contains a linear reinforcing thread is also part of the invention, and such embodiments are described in the Examples hereinafter.

Figure 5:
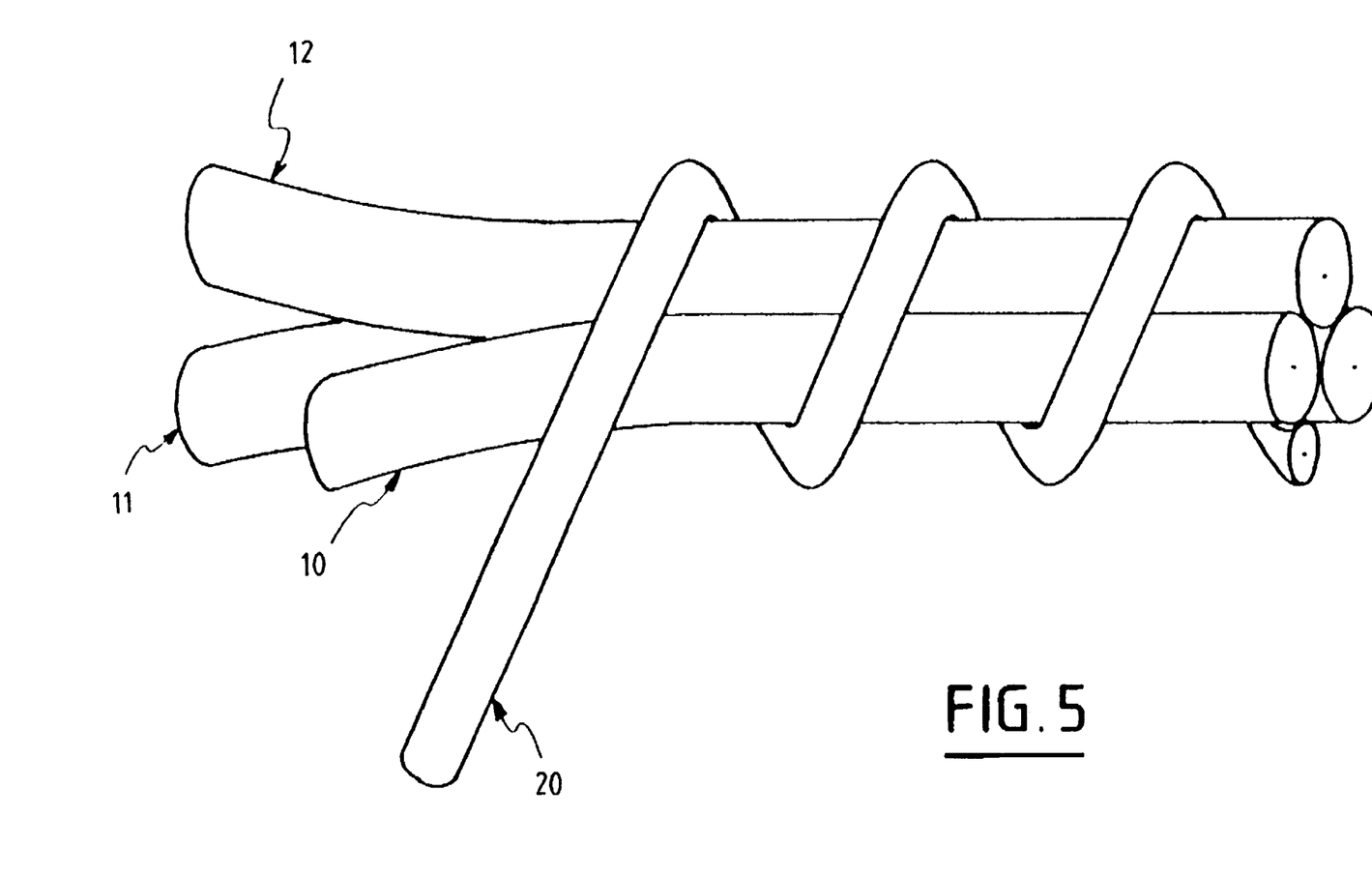
FIG. 5 shows another embodiment of the thread according to the invention where the core is constituted by an assembly of threads adapted to be eliminated and non-eliminated.

FIG. 5 schematically shows the case of a thread according to the invention whose core is constituted by a plurality of threads, here three threads 10, 11, 12, possibly of different nature, certain being able to be eliminated and others not.

It is also possible according to the invention, previously to manufacture the central thread in a more elaborate form, such as a strand of eliminatable threads and non-eliminatable threads.

Another variant of threads according to the invention in which the core of the thread is formed both of eliminatable and non-eliminatable material, consists in using, as thread constituting the core of the thread of the invention, a thread constituted by a non-eliminatable matter coated with an eliminatable matter, the coating being able to be obtained by any process such as varnishing, coating, electrophoresis, galvanic deposit, by which a thread of a non-eliminatable matter is coated with an eliminatable matter.

The following Examples are given purely by way of illustration of the invention and its advantages.

EXAMPLES

With a view to illustrating the present invention, in non-limiting manner, some descriptive examples of practical embodiment of the threads obtained and their uses, are given hereinbelow.

Examples 1 to 6 demonstrate an essential advantage of the invention which is the freedom in the choice of the mass and of the geometry of the threads. Similarly, the practical production of the fabrics of Examples 7 to 12 demonstrates that this advantage also exists for the products manufactured with the threads of the invention. The threads according to the invention make it possible to obtain, by way of example, fabrics of which the mass per $m^2$ is from 1.25 to 3 times greater than that of the cloths of the prior art, these limits being in no wise that of the invention. This advantage is obtained by employing the same threads as those which constitute the cloths of the prior art, and by incorporating them as filiform elements to show at least one helical element constituting the threads according to the invention.

Another property of the threads of the invention when they are employed in the weaving technique is that they allow several possible constructions to obtain the same mass per $m^2$ of the finished products. This property is illustrated by Examples 9 and 12 which concern the manufacture of cloths whose mass per $m^2$ is close to 1100 g. Example 9 uses a warp comprising 32 threads/cm, whilst in Example 12, the warp comprises only 16 threads/cm, the weft threads always being at 24/cm; the lesser quantity of matter in the warp is compensated by using a heavier thread weftwise, such increase in mass of the weft thread having been obtained by increasing the number of turns to the cm in the preparation of the weft thread according to the invention. This property constitutes an advantage contributed by the threads of the invention to the weaving technique, as they make it possible to reduce the number of the warp threads and therefore substantially to reduce the warp assembly time and therefore the manufacturing costs.

This embodiment of the threads according to the invention, which has the apparent effect of increasing the quantity of matter present in each $m^2$ of fabric, is not translated by a reduction in the transparency and an increase in the pressure drop, as would occur by increasing the number of threads of a fabric of the prior art. The specific property that the threads according to the invention procure is that they make it possible to prepare thicker products than those which are obtained by weaving linear threads; in fact, the products made become veritably three-dimensional, their thickness being able to be chosen freely from the value of the diameter "D" of the core serving for the winding. When weaving fabrics of the prior art, the thickness depends only on the diameter of the threads, the mechanical tension applied during weaving and on the weaving pattern: the thickness of a fabric of the prior art is twice the diameter of the threads in straight weaving and about three times the diameter of the threads in herringbone weaving.

The practical embodiment of the fabrics of Examples 8 to 12 has made it possible to discover two other advantages of the products according to the invention over the products of the prior art.

A novel property of the fabrics prepared with the threads of the invention is that they present an increased rigidity which renders very difficult their deformation in the sense of the bisectrices of the directions of the warp threads and of the weft threads, whilst this type of deformation is very easy with the fabrics of the prior art. This property results in that a circular cloth according to the invention has the advantage of conserving its circular shape after handlings, whilst a cloth of the prior art manipulated without precautions easily becomes oval.

This property is the consequence of the imbrication of the warp threads which are linear threads in our Examples, between the turns of the weft threads, which are helical threads according to the invention.

The second advantage precisely concerns the contact between the reagent gases and the threads of active matter. In a cloth of the prior art, there are numerous points of intersection with punctual contact between the weft threads and the warp threads; there is exactly one intersection of threads per stitch, these stitches being most usually 1024/ $cm^2$ in number, when the cloth comprises 32 warp threads and 32 weft threads/cm. It is well known to the man skilled in the art that an examination of the worn catalytic cloths with a scanning microscope reveals that the points of intersection and the close zone which surrounds them are regions hardly active from the standpoint of catalysis as these zones constitute anfractuosities in which the reagent gases only diffuse with difficulty. In a cloth of the prior art, the intersections of threads are therefore hardly active zones which contain a fraction of surface of the threads which remains hardly or not useful on contact of the gases with the threads.

In a cloth woven with a thread according to the invention, comprising an element in helical form, the intersections of threads, referred to the unit of mass, are less numerous, at equal meshing, than in a cloth of the prior art; this is simply due to the fact that the helix turns included between two intersections represent a larger quantity of matter than the simple linear thread which would replace this helix. Moreover, the use of the threads according to the invention allows a reduction in the number of the warp threads and of the weft threads, whilst making it possible to manufacture denser fabrics than the fabric of the prior art, as Examples 7 to 11 show. It follows that the threads according to the invention allow a considerable reduction in the number of effective points of intersection between threads, and therefore better use of the surface of the threads used. Moreover, in the case of products woven with threads of the invention, the geometrical orientation of the points of intersection between threads is different from that which is presented by the prior products; in fact, in the prior products, the points of intersection always lie beneath a thread, which creates an effect of shading and renders them hardly accessible to the gaseous current which must surround this thread; in a fabric containing threads of the invention for weft threads and linear threads for the warp, the orientation of the helix turns is almost orthogonal with respect to the preceding case; it follows that the points of intersection of threads present their opening directly in the direction of the gaseous current and that they may therefore be more efficient for the contacts with the reaction gases.

In summary, the threads according to the invention allow a reduction in the density of the points of intersection, referred to the unit of mass, as well as an improvement in the circulation of the gases in the remaining points of intersection. These properties are together translated by an increase in the surface available for the exchanges with the gaseous phase, as well as by an improvement in the diffusion towards this surface, with the consequence for the final use of a substantial increase in the catalysis yield and an increase in the life duration of the catalytic cloths. In the case of applying the threads of the invention to the cloths of palladium alloy used for collecting the volatilized platinum, the advantage procured is an improved efficiency of collection.

Furthermore, Example 15 clearly shows the specific gain in mass obtained for a composite knit made by associating a simple thread and a thread according to the invention with respect to the knit obtained on the same machine with a simple linear thread and described in Comparative Example 14.

The present invention is applicable to the preparation of felts, woven fabrics, knits or any assemblings of threads of precious metals and alloys thereof which are used as catalytic mass for the manufacture of nitric acid, or hydrocyanic acid, or as device for collecting the precious metals volatilized during these reactions.

EXAMPLE 1

A thread of platinum alloy with 8% rhodium, with a diameter of 76 µm, which has a mass of 92 mg/m, is wound around a thread of cotton of caliber 60 at a rate of 70 turns/cm. The thread obtained has a diameter of 320 µm and a mass of 450 mg/m comprising 36 mg of cotton per meter.

EXAMPLE 2

A thread of palladium alloy with 5% copper, with a diameter of 76 µm, which has a mass of 53 mg/m, is wound around a thread of cotton of caliber 60 at a rate of 70 turns/cm. The thread obtained has a diameter of 320 µm and a mass of 320 mg/m, comprising 36 mg of cotton per meter.

EXAMPLE 3

A thread of cotton of caliber 60 and a thread of platinum alloy with 8% rhodium, with a diameter of 76 µm, are disposed in parallel. A second thread of platinum alloy with 8% rhodium, of 76 μm diameter, is wound around the two preceding threads at a rate of 70 turns/cm. The thread obtained has a flattened profile; its apparent diameter is from 300 to 350 μm and its mass is 570 mg/m, comprising 36 mg of cotton per meter.

EXAMPLE 4

A thread of cotton of caliber 60 and a thread of palladium alloy with 5% copper, with a diameter of 76 μm, which has a mass of 53 mg/m, are disposed in parallel. A second thread of palladium alloy with 5% copper, of 76 μm diameter, is wound around the two preceding threads at a rate of 70 turns/cm. The thread obtained has a flattened profile; its apparent diameter is from 300 to 350 μm and its mass is 380 mg/m, comprising 36 mg of cotton per meter.

EXAMPLE 5

A thread of cotton of caliber 60 and a thread of platinum alloy with 8% rhodium, with a diameter of 76 μm, are disposed in parallel. A second thread of platinum alloy with 8% rhodium, with a diameter of 76 μm, is wound around the two preceding threads at a rate of 35 turns/cm. The thread obtained has a diameter of 300 μm and a mass of 400 mg/m, comprising 36 mg of cotton per meter.

EXAMPLE 6

A thread of cotton of caliber 60 and a thread of palladium alloy with 5% copper, with a diameter of 76 μm, which has a mass of 53 mg/m, are disposed in parallel. A second thread of palladium alloy with 5% copper, with a diameter of 76 μm, is wound around the two preceding threads at a rate of 35 turns/cm. The thread obtained has a flattened profile; its apparent diameter is from 300 to 350 μm and its mass is 230 mg/m, comprising 36 mg of cotton per meter.

Examples 1 to 6 demonstrate the first essential advantage of the invention, which is that of procuring a considerable freedom of construction by the choice of the mass and the microgeometry of the threads that the invention produces, as a function of the outer diameter $D_e$, the diameter "d" of the initial thread, the inner diameter "D" of the turns, determined by the structure of the central thread and of the pitch "p" of the winding which is the distance between the axes of two adjacent turns.

A preferred industrial method for manufacturing the threads described in the Examples is the use of a wrapping machine. However, this preferred method is in no way limiting, the threads according to the invention also being able to be obtained by other processes such as winding on a mandrel; in that case, the helix obtained is disengaged by sliding out of the mandrel as it is formed. A hollow mandrel may make it possible to introduce one or more threads inside the helix, without these threads serving as winding support.

To complete the illustration of the present invention, in non-limiting manner, some descriptive Examples of practical embodiment of the finished products which may be manufactured by means of the novel threads according to the invention, are given hereinbelow.

EXAMPLE 7

The thread of Example 3, constituted by a thread of platinum alloy with 8% rhodium, with a diameter of 76 μm, wound at a rate of 70 turns/cm around a thread of cotton and by a thread of platinum alloy with 8% rhodium, with a diameter of 76 μm, is used for manufacturing a fabric, by means of a manual weaving loom.

In this way, a woven cloth is produced, comprising warp threads distant by 6.35 mm and contiguous weft threads. A disc of 70 mm diameter of this fabric contains a mass of precious metals of 7.0 g, or a mass of 1820 g/m². By way of comparison, the fabric of the prior art prepared with the same thread, which is woven with 32 threads/cm warpwise and weftwise, and which comprises 1024 stitches/cm², has a mass of 620 g/m².

The fabric of this Example, prepared by means of a thread according to the invention, may be used as catalytic cloth in an ammonia oxidation installation, replacing 3 cloths of the prior art.

EXAMPLE 8

The thread of Example 5, constituted by a thread of platinum alloy with 8% rhodium, with a diameter of 76 μm, wound at a rate of 35 turns/cm about a thread of cotton and by a thread of platinum alloy with 8% rhodium, with a diameter of 76 μm, is used for manufacturing a fabric, by means of an industrial weaving loom 2.50 m wide.

The thread according to the invention is used as weft thread, the warp threads being simple threads, of the same alloy, 76 μm diameter. The fabric obtained comprises 32 warp threads/cm and 24 weft threads/cm. The average mass of this fabric is 1211 g/m², viz. 95% more than the mass of 620 g/m² of the fabric of the prior art prepared with the same thread, and woven with 32 threads/cm warpwise and weftwise. The thickness of the fabric obtained with the thread of the invention is 340 μm, whilst the fabric of the prior art has a thickness of 210 μm, slightly more than double the diameter of the threads.

The fabric of this Example prepared by means of a thread according to the invention may be used as catalytic cloth in an ammonia oxidation installation, replacing 2 cloths of the prior art.

EXAMPLE 9

The thread of Example 5, constituted by a platinum alloy with 8% rhodium, 76 μm diameter, wound at a rate of 35 turns/cm around a thread of cotton and by a thread of platinum alloy with 8% rhodium, 76 μm diameter, is used for manufacturing a fabric, by means of an industrial weaving loom 2.50 m wide.

The thread according to the invention is used as weft thread, the warp threads being simple threads, of the same alloy, 76 μm diameter. The fabric obtained comprises 32 warp threads/cm and 21 weft threads/cm. The average mass of this fabric is 1098 g/m², viz. 77% more than the mass of 620 g/m² of the fabric of the prior art prepared with the same thread, and woven with 32 threads/cm warpwise and weftwise. The thickness of the fabric obtained with the thread of the invention is 340 μm, whilst the fabric of the prior art has a thickness of 210 μm, slightly more than double the diameter of the threads.

The fabric of this Example, prepared by means of a thread according to the invention, may be used as catalytic cloth in an ammonia oxidation installation, 2 thicknesses of this novel fabric being able to replace 2 cloths of the prior art.

EXAMPLE 10

The thread of Example 6, constituted by a thread of palladium alloy with 5% copper, 76 μm diameter, wound at a rate of 35 turns/cm around a thread of cotton and by a thread of palladium alloy with 5% copper, 76 μm diameter, is used for manufacturing a fabric by means of an industrial weaving loom 2.50 m wide.

The thread according to the invention is used as weft thread, the warp threads being simple threads, of the same alloy, 76 μm diameter. The fabric obtained comprises 32 warp threads/cm and 19 weft threads/cm. The average mass of this fabric is 575 g/m$^2$, viz. 47% more than the mass of 390 g/m$^2$ of the fabric of the prior art woven with 32 threads/cm warpwise and weftwise, prepared with the same thread. The thickness of the fabric obtained with the thread of the invention is 340 μm, whilst the fabric of the prior art has a thickness of 210 μm, slightly more than double the diameter of the threads.

The fabric of this Example, prepared by means of a thread according to the invention, may be used as cloth for recovering the volatilized platinum in an ammonia oxidation installation, its capacity of absorption of platinum being about 1.5 times that of a cloth of the prior art.

Examples 7 to 10 above describe embodiments of products using threads of the invention and, apart from a thread of cotton, including only precious metals of homogeneous composition. It is also possible to create products including threads of precious metals according to the invention associated with threads of common metals, as shown by Example 11 in descriptive and non-limiting manner.

EXAMPLE 11

The thread of Example 5, constituted by a thread of platinum alloy with 8% rhodium, 76 μm diameter, wound at a rate of 35 turns/cm around a thread of cotton and by a thread of platinum alloy with 8% rhodium, 76 μm diameter, is used for manufacturing a fabric by means of an industrial weaving loom 2.50 m wide.

The thread according to the invention is used as weft thread, the warp threads being simple threads, of a refractoy alloy such as Kanthal (Registered Trademark of the firm Bulten-Kanthal AB), 60 μm diameter. The fabric obtained comprises 16 warp threads/cm and 21 weft threads/cm. The average mass of this fabric is 822 g/m$^2$, decomposing into 788 g of threads of platinum alloy with 8% rhodium and 34 g of threads of refractory alloy. The catalytically active part of this fabric, namely the 788 g of threads of plating alloy with 8% rhodium, represent a mass per m$^2$ greater by 27% than the mass of 620 g/m$^2$ of the fabric of the prior art prepared with the same thread and woven with 32 threads/cm warpwise and weftwise. The thickness of the fabric obtained with the thread of the invention is 340 μm, whilst the fabric of the prior art has a thickness of 210 μm, slightly more than double the diameter of the threads.

The fabric of this Example prepared by means of a thread according to the invention to which is added a refractory thread, may be used as catalytic cloth in an ammonia oxidation installation, 4 thicknesses of this novel fabric being able to replace 5 cloths of the prior art.

EXAMPLE 12

A thread according to the invention is constituted by a thread of platinum alloy with 8% rhodium, 76 μm diameter, wound at a rate of 42 turns/cm around a thread of cotton and by a thread of platinum alloy with 8% rhodium, of 76 μm diameter; its mass is 480 mg/m. It is used for manufacturing a fabric, by means of an industrial weaving loom 2.50 m in width.

The thread according to the invention is used as weft thread, the warp threads being simple threads, of the same alloy, 76 μm diameter. The fabric obtained comprises 16 warp threads/cm and 21 warp threads/cm. The average mass of this fabric is 1092 g/m$^2$, viz. 76% more than the mass of 620 g/m$^2$ of the fabric of the prior art prepared with the same thread, and woven with 32 threads/cm warpwise and weftwise. The thickness of the fabric obtained with the thread of the invention is 340 μm, whilst the fabric of the prior art has a thickness of 210 μm, slightly more than double the diameter of the threads.

The fabric of this Example, prepared by means of a thread according to the invention, may be used as catalytic cloth in an ammonia oxidation installation, 2 thicknesses of this novel fabric being able to replace 3 cloths of the prior art.

EXAMPLE 13

The thread of Example 5, constituted by a thread of platinum alloy with 8% rhodium, 76 μm diameter, wound at a rate of 25 turns/cm around a thread of cotton and by a thread of platinum alloy with 8% rhodium, 76 μm diameter, is used for manufacturing a knit by means of an industrial knitting machine with a diameter of 600 mm.

The thread according to the invention is used as single thread for supplying this machine, which comprises 12 needles/cm. The tubular knit obtained has a flat width of 1880 mm, it comprises 12 stitches/cm and 9 rows/cm, viz. 108 stitches per cm$^2$. The average mass of this knit is 780 g/m$^2$, viz. 26% more than the mass of 620 g/m$^2$ of the fabric of the prior art prepared with the same thread, and woven with 32 threads/cm warpwise and weftwise. The thickness of the knit obtained with the thread of the invention is 700 μm, whilst the fabric of the prior art has a thickness of 210 μm, slightly more than double the diameter of the threads.

The fabric of this Example, prepared by means of a thread according to the invention, may be used as catalytic cloth in an ammonia oxidation installation, 3 thicknesses of this novel fabric being able to replace 4 cloths of the prior art.

EXAMPLE 14 (Comparative)

A simple thread of platinum alloy with 5% rhodium, with 76 μm diameter, is used for supplying a circular knitting machine with a diameter of 700 mm, equipped with gauge 24 needles. The mechanism of this machine is adapted to obtain the simplest knit, or jersey.

Figure 6:
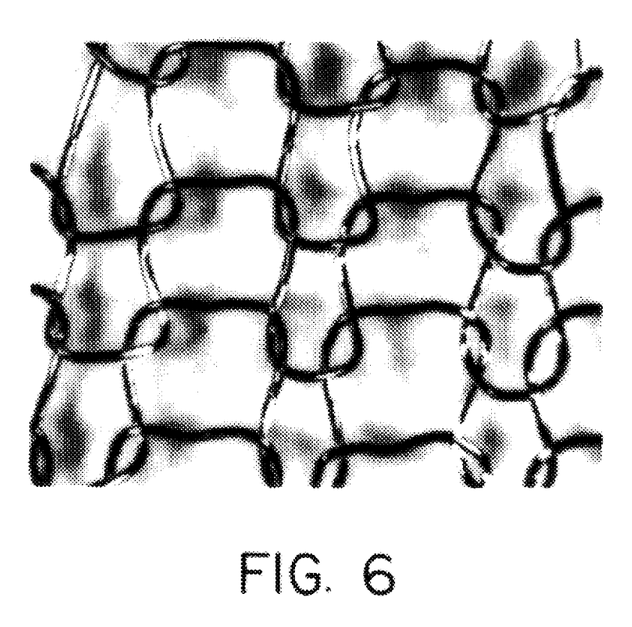
FIG. 6 reproduces by way of comparison, a photograph of a knit obtained from a linear thread and described in comparative Example 14.

The use of 1250 g of thread made it possible to obtain a tubular knit 2.21 m long and with a diameter of 650 mm representing a surface of 4.52 m$^2$. The photograph reproduced in FIG. 6 shows the macrostructure of this knit magnified 25 times. The specific mass of this knit is 276 g/m$^2$ By way of comparison, the fabric of the prior art prepared with the same thread, which is woven with 32 threads per cm warpwise and weftwise, and which comprises 1024 stitches per cm$^2$ has a mass of 620 g/m$^2$.

EXAMPLE 15

A simple thread of platinum alloy with 5% rhodium, with a diameter of 76 μm, is used in the same way as in Example 14 for supplying a circular knitting machine with a diameter of 700 mm, equipped with gauge 24 needles.

Furthermore, a thread according to the invention is prepared in the following manner: 2 threads of cotton of caliber 60 are disposed in parallel. A thread of platinum alloy with 5% rhodium, of 76 μm diameter, is wound around the two preceding threads at a rate of 35 turns per cm. The thread obtained has a mean diameter of 300 μm and a mass of 295 mg per meter, comprising 72 mg of cotton.

Figure 7:
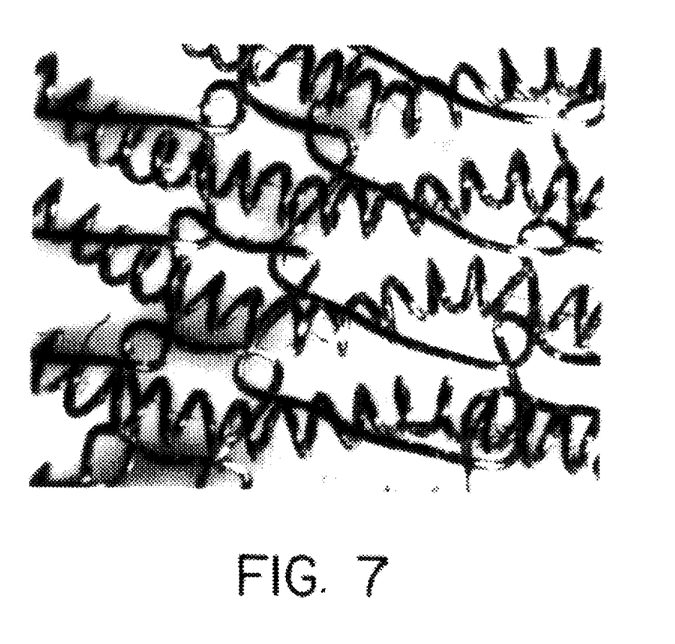
FIG. 7 reproduces a photograph of a knit obtained from a thread according to the invention and described in Example 15.

The knitting machine is provided with a second supply device which receives the thread according to the invention:

under these conditions, it is possible to obtain a composite knit associating the simple thread, which constitutes a network disposed according to the description of Example 14, and the thread according to the invention, which is inserted between the meshes of the preceding network. The photograph reproduced in FIG. 7 shows the macrostructure of the knit obtained, magnified 25 times, after the threads of cotton included in the thread according to the invention have been eliminated by combustion. The specific mass of this knit is 645 g/m$^2$, composed of 276 g/m$^2$ of simple thread arranged in jersey form as described in Example 14 and of 369 g/m$^2$ of thread according to the invention which are disposed in parallel at a rate of 15 threads per cm.

The knit obtained in this Example has a specific mass very close to that of a fabric of the prior art prepared with the same thread, which is woven with 32 threads per cm warpwise and weftwise, to attain a mass of 620 g/m$^2$.

EXAMPLE 16

A simple thread of an alloy for electrical resistors such as GILPHY 70 (Registered Trademark of the firm IMPHY), with a diameter of 80 μm and a mass of 41 mg per meter, is used in the same manner as in Example 14 for supplying a circular knitting machine with a diameter of 700 mm, equipped with gauge 24 needles.

Furthermore, a thread according to the invention is prepared in the following manner: 2 threads of cotton of caliber 60 are disposed in parallel. A thread of platinum alloy with 5% rhodium, of 76 μm diameter, is wound around the two preceding threads at a rate of 55 turns per cm. The thread obtained has a mean diameter of 300 μm and a mass of 405 mg per meter, comprising 72 mg of cotton.

Figure 8:
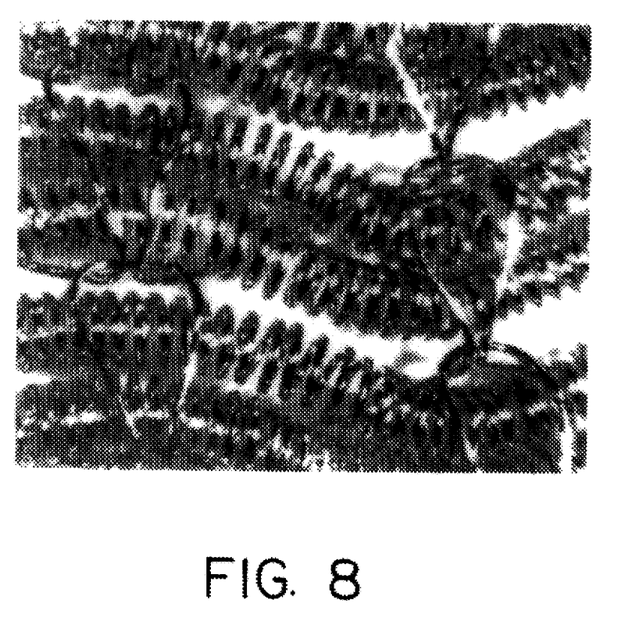
FIG. 8 reproduces a photograph of a knit obtained in accordance with Example 16.

The knitting machine is provided with a second supply device which receives the thread according to the invention: under these conditions, it is possible to obtain a composite knit associating the simple thread, which constitutes a network arranged according to the description of Example 14, and the thread according to the invention, which is inserted between the meshes of the preceding network. The photograph reproduced in FIG. 8 shows the macrostructure of the knit obtained, magnified 25 times, after the threads of cotton included in the thread of the invention have been eliminated by combustion; this macrostructure is identical to that of Example 15. The specific mass of this knit is 703 g/m$^2$, composed of 123 g/m$^2$ of GILPHY 70 thread arranged in jersey form as described in Example 14, and 580 g/m$^2$ of thread of platinum alloy with 5% rhodium according to the invention which are disposed in parallel at a rate of 15 threads per cm.

The knit obtained in this Example has a specific mass in precious metal contained therein very close to that of a fabric of the prior art prepared with the same thread, which is woven with 32 threads per cm warpwise and weftwise, to attain a mass of 620 g/m$^2$.

We claim:

1. A wire comprising a helical winding made of at least one first thread which is helically wound around at least one second thread constituting the core of said wire, wherein the helical winding comprises at least one first thread made of material selected from the group consisting of the metals of the platinoid group and alloys thereof.

2. The wire according to claim 1, wherein said core comprises at least one thread made of a material adapted to be removed by dissolution, melting or combustion.

3. The wire according to claim 1, wherein said core is comprised of a material which is chemically inert.

4. The wire according to claim 1, wherein the core comprises at least one thread made of material selected from the group consisting of the metals of the platinoid group and alloys thereof.

5. The wire according to claim 1, wherein the helical winding comprises at least one thread made of platinum or of a platinum alloy.

6. The wire according to claim 1, wherein the helical winding comprises at least one thread made of palladium alloy.

7. The wire according to claim 1, wherein the helical winding is comprised of a plurality of parallel threads of which at least one is comprised of a material selected from the group consisting of the metals of the platinoid group and alloys thereof.

8. The wire according to claim 1, wherein the mass per unit of length of said wire is between 1.5 and 5 times the mass of said first thread.

9. The wire according to claim 1, wherein the helical winding is comprised of a plurality of turns and the distance between two consecutive turns of the helical winding is between 0.25 and 4 times the diameter of said first thread.

10. An assembling of wires wherein said assembling is manufactured by a technique selected from the group consisting of weaving, knitting, sewing and embroidery techniques and comprises at least one wire comprising at least one helically wound thread made of a material selected from the group consisting of the metals of the platinoid group and alloys thereof.

11. The assembling according to claim 10 wherein said wire further comprises a core around which said thread is helically wound.

12. The assembling according to claim 11, wherein the core comprises at least one thread made of a material selected from the group consisting of the metals of the platinoid group and alloys thereof.

13. The assembling according to claim 10, wherein the helical winding comprises at least one thread made of platinum or of a platinum alloy.

14. The assembling according to claim 10, wherein the helical winding comprises at least one thread made of palladium alloy.

15. The assembling according to claim 10, wherein the helical winding is comprised of a plurality of parallel threads of which at least one is comprised of a material selected from the group consisting of the metals of the platinoid group and alloys thereof.

16. The assembling according to claim 10, wherein the mass per unit of length of said helical winding is between 1.5 and 5 times the mass of said first thread.

17. The assembling according to claim 10, wherein the distance between two consecutive turns of the helical winding is between 0.25 and 4 times the diameter of said first thread.

18. The assembling of wires according to claim 10 wherein said assembling is a knit manufactured by a knitting technique.

19. The assembling according to claim 10, wherein said wire comprising a helical winding is inserted between the stitches of a knit cloth which is manufactured by knitting a linear thread.

20. The assembling according to claim 19, wherein said linear thread is made of a material selected from the group consisting of metals of the platinoid group, platinoid alloys and refractory materials.

21. The assembling according to claim 10, wherein said assembling is manufactured by a weaving technique.

22. The assembling according to claim 21, wherein the wires comprising helically wound threads represent only a part of the threads used for manufacturing said weave, the other threads being comprised of linear threads intended to ensure reinforcement of the woven product.

23. A device acting as a catalyst wherein said device comprises an assembling of wires manufactured by a technique selected from the group consisting of weaving, knitting, sewing and embroidery techniques and comprising at least one wire comprising at least one helically wound thread made of a material selected from the group consisting of the metals of the platinoid group and alloys thereof.

24. The device according to claim 23 wherein said at least one wire further comprises a core around which said thread is helically wound.

25. The device according to claim 24, wherein the core comprises at least one thread made of a material selected from the group consisting of the metals of the platinoid group and alloys thereof.

26. The device according to claim 23, wherein the helical winding comprises at least one thread made of platinum or of a platinum alloy.

27. The device according to claim 23, wherein the helical winding is comprised of a plurality of parallel threads of which at least one is comprised of constituted by a material selected from the group consisting of the metals of the platinoid group and the alloys thereof.

28. The device according to claim 23, wherein the mass per unit of length of said helical winding is between 1.5 and 5 times the mass of said at least one thread.

29. The device according to claim 23, wherein the distance between two consecutive turns of the helical winding is between 0.25 and 4 times the diameter of said at least one thread.

30. The device according to claim 23 wherein said device is manufactured by a knitting technique.

31. The device according to claim 23, wherein said wire comprising a helically winding is inserted between the stitches of a knit manufactured by knitting a linear thread.

32. The device according to claim 31, wherein said linear thread is made of a material selected from the group consisting of metals of the platinoid group, platinoid alloys and refractory materials.

33. The device according to claim 23, wherein said device is manufactured by a weaving technique.

34. The device according to claim 33, wherein the wires comprising helically wound threads represent only a part of the threads used for manufacturing said weave, the other threads being constituted by linear threads intended to ensure reinforcement of the woven product.

35. The device according to claim 23, acting as a catalyst and destined to the reaction of oxidation of ammonia into nitrogen oxide with a view to preparing nitric acid or to the reaction of preparation of hydrocyanic acid, wherein the helically wound thread is a thread of platinum or platinum alloy.

36. A device for recovering particles of precious metals or alloys thereof used as catalysts of chemical reactions wherein said device comprises an assembling of wires manufactured by a technique selected from the group consisting of weaving, knitting, sewing and embroidery techniques and comprising at least one thread comprising at least one helically wound wire made of material selected from the group consisting of the metals of the platinoid group and alloys thereof.

37. The device according to claim 36 wherein said wire further comprises a core around which said thread is helically wound.

38. The device according to claim 37, wherein the core comprises at least one thread made of a material selected from the group consisting of the metals of the platinoid group and alloys thereof.

39. The device according to claim 36, wherein the helical winding comprises at least one thread made of palladium or of a palladium alloy.

40. The device according to claim 34, wherein the helical winding is comprised of a plurality of parallel threads of which at least one is comprised of a material selected from the group consisting of the metals of the platinoid group and alloys thereof.

41. The device according to claim 36, wherein the mass per unit of length of said helical winding is between 1.5 and 5 times the mass of said at least one thread.

42. The device according to claim 36, wherein the distance between two consecutive turns of the helical winding is between 0.25 and 4 times the diameter of said at least one thread.

43. The device according to claim 36 wherein said device is manufactured by a knitting technique.

44. The device according to claim 36, wherein said wire comprising a helical winding is inserted between the stitches of a knit manufactured by knitting a linear thread.

45. The device according to claim 44, wherein said linear thread is made of a material selected from the group consisting of metals of the platinoid group, platinoid alloys and refractory materials.

46. The device according to claim 36, wherein said device is manufactured by a weaving technique.

47. The device according to claim 46, wherein the wires comprising helically wound threads represent only a part of the threads used for manufacturing said weave, the other threads being comprised of linear threads intended to ensure reinforcement of the woven product.

48. A method of using a catalyst in a chemical reaction which comprises providing a catalyst that is comprised of an assembling of wires comprising at least one wire that includes a helically wound thread made of a material selected from the group consisting of the metals of the platinoid group and alloys thereof, and using said catalyst in order to perform said chemical reaction.

49. A method of using a catalyst according to claim 48 wherein the mass per unit of length of said helical winding is between 1.5 and 5 times the mass of said first thread.

50. A method of using a catalyst according to claim 48 wherein the distance between two consecutive turns of the helical winding is between 0.25 and 4 times the diameter of said first thread.

51. A method of using a catalyst according to claim 48 wherein said helically wound thread is made of a material selected from the group consisting of platinum, a platinum alloy, palladium and a palladium alloy.

52. A method of using a device for recovering particles of precious metals or alloys thereof used as catalysts of chemical reactions which comprises providing a device that is comprised of an assembling of wires comprising at least one wire that includes a helically wound thread made of a material selected from the group consisting of the metals of the platinoid group and alloys thereof, and using said device for recovering said particles.

53. A method of using a device for recovering particles according to claim 52 wherein the mass per unit of length of said helical winding is between 1.5 and 5 times the mass of said first thread.

54. A method of using a device for recovering particles according to claim 52 wherein the distance between two consecutive turns of the helical winding is between 0.25 and 4 times the diameter of said first thread.

55. A method of using a device for recovering particles according to claim 52 wherein said helically wound thread is made of a material selected from the group consisting of palladium and a palladium alloy.

56. A method according to claim 48 wherein said assemblying of wires is manufactured by a technique selected from the group consisting of weaving, knitting, sewing and embroidery.

57. A method according to claim 52 wherein said assemblying of wires is manufactured by a technique selected from the group consisting of weaving, knitting, sewing and embroidery.

* * * * *